United States Patent [19]

Matsui et al.

[11] Patent Number: 4,661,424
[45] Date of Patent: Apr. 28, 1987

[54] SODIUM-SULFUR STORAGE BATTERY

[75] Inventors: Kazumasa Matsui; Asao Kunimoto, both of Takatsuki, Japan

[73] Assignee: Yuasa Battery Co., Osaka, Japan

[21] Appl. No.: 784,479

[22] Filed: Oct. 4, 1985

[51] Int. Cl.⁴ .......................................... H01M 10/39
[52] U.S. Cl. .............................. 429/104; 174/152 GM; 429/181
[58] Field of Search ............... 429/104, 181; 174/152 GM, 150

[56] References Cited

U.S. PATENT DOCUMENTS

| | | | |
|---|---|---|---|
| 3,854,827 | 12/1974 | Merz et al. | 174/152 GM |
| 3,901,772 | 8/1975 | Guillotin et al. | 174/152 GM |
| 4,074,026 | 2/1978 | Bones | 429/104 |
| 4,104,448 | 8/1978 | Gibson et al. | 429/104 |

Primary Examiner—Donald L. Walton
Attorney, Agent, or Firm—Burns, Doane, Swecker & Mathis

[57] ABSTRACT

A sodium-sulfur storage battery comprises an alpha alumina ring, a sodium conductive solid electrolyte tube and solder glass jointing said ring and said tube together; and is characterized in that the alpha alumina ring is provided at its open end with a groove for collecting the solder glass, a width of said groove is in a range from 0.2 mm to 5 mm and a depth of said groove is in a range from 0.2 mm to 10 mm. A surface of the solder glass is formed at a position inner than an end surface of the alpha alumina ring. Said groove may have a section of a rectangular shape. An inside surface of said groove may have a section of a round shape or an oblique section.

4 Claims, 6 Drawing Figures (O: SUfficient Gastightness)
(X: Insufficient Gastightness)

SODIUM-SULFUR STORAGE BATTERY

BACKGROUND AND SUMMARY OF THE INVENTION

The present invention relates to a sodium-sulfur storage battery in which molten sodium is used as a negative reactant, molten sulfur-sodium polysulfide is used as a positive reactant and a sodium-ion conductive solid electrolyte tube is used as an electrolyte, and more particularly, to a storage battery in which gas tightness is improved at a solder-glass-joint between an alpha alumina ring and the solid electrolyte tube.

The sodium-sulfur storage battery is a secondary battery in which both reactants are separated by the sodium-ion conductive solid electrolyte tube of, e.g., beta alumina, beta-two-dash alumina or nasicon provided with a bottom and is operated at a high temperature of about 300°–400° C. As shown in FIG. 1, a solid electrolyte tube 2 is inserted into an annular hollow provided in an alpha alumina ring 1, and is heat-treated to be joined together by solder glass 3 filled in a space of 0.1–0.2 mm therebetween. A solder glass surface 4 largely swells from the alpha alumina ring 1 before the joint, and upon the heat-treatment, a solder glass surface 5 retracts toward the bottom of the alpha alumina ring 1 and fixes the solid electrolyte tube 2 and the alpha alumina ring 1 together. However, through heat cycles (between ordinary temperature and 400° C., temperature rising rate: 200° C./H, 400° C.-maintaining time: 30 minutes) during the operation of the battery, cracks 6 are generated initially on the surface, as shown in FIG. 2, and gradually extend to the interior of the solder glass 3 after the two-five cycles, and finally, penetrating cracks 7 are formed. The penetrating cracks 7 break the gastightness with respect to the atmosphere, and thus, the negative reactant, i.e., sodium, in the solid electrolyte tube is oxidized, which reduces an operation capacity of the battery.

Accordingly, it is an object of the invention to provide a sodium-sulfur storage battery, overcoming the above-noted disadvantages.

The present invention is described by way of example, with reference to the accompanying drawings.

DETAILED DESCRIPTION OF THE PREFERRED EMBODIMENT

Figure 1:
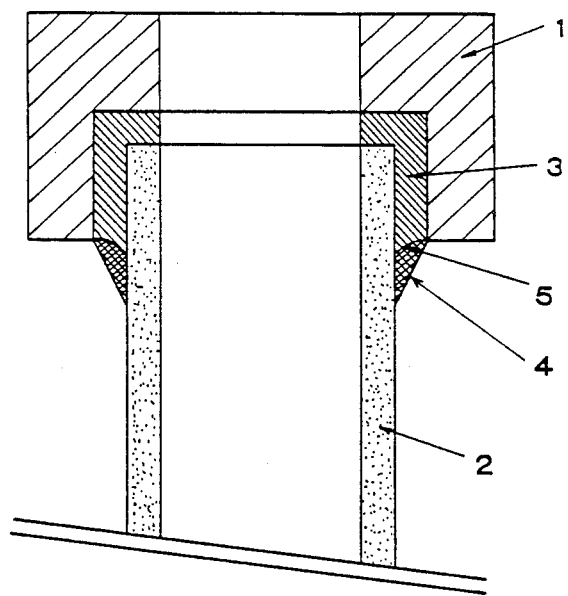
FIG. 1 is a sectional view of a known assembly of an alpha alumina ring and a solid electrolyte tube.
Figure 2:
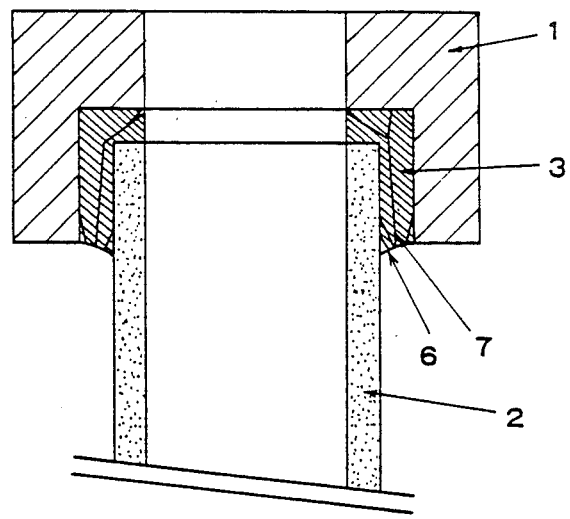
FIG. 2 is a sectional view of the assembled part of FIG. 1 in which cracks are generated.
Figure 3:
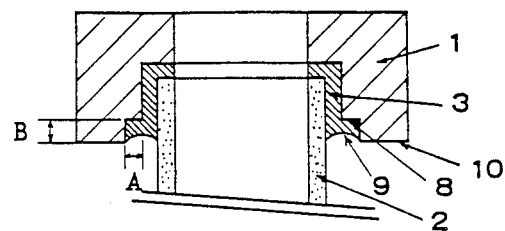
FIGS. 3, 4 and 5 are sectional views of different embodiments of the present invention, respectively.
Figure 6:
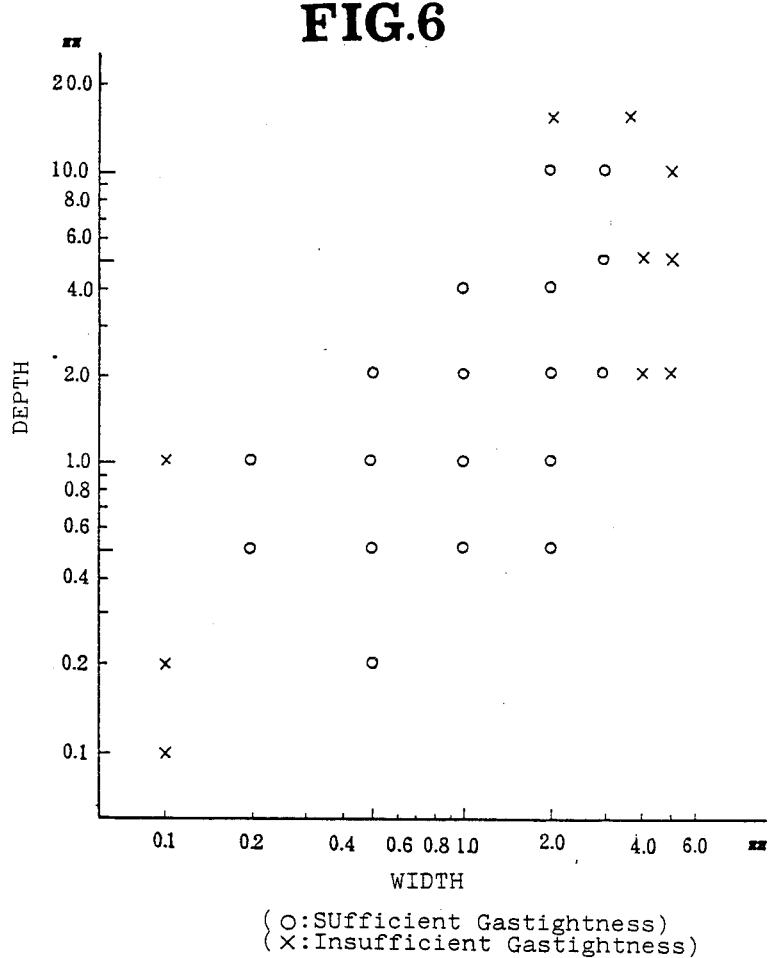
FIG. 6 is a graph of gastightness characteristics with respect to various sizes of a groove.

Referring to FIG. 3, same members and parts as those in FIG. 1 bear same reference numbers. A battery according to the invention comprises an alpha alumina ring 1, a solid electrolyte tube 2 is disposed in a recess of the ring 1. Solder glass 3 is filled in an annular space of the recess defined between the ring 1 and the tube 2. The alpha alumina ring 1 is provided at a longitudinally outer portion of the annular space with an enlargement forming a groove 8 for accumulating or collecting the solder glass. In the illustrated embodiment, the groove 8 has a rectangular section. According to this structure, when the molten solder glass 3 solidifies, a surface 9 of the solder glass 8 can be formed at a position lower or more inwardly than an end surface 10 of the alpha alumina ring 1. Namely, a part of the filled solder glass 8, which is exposed in the conventional structures, is located in the groove 8 according to the invention, and is formed as illustrated after the heat-treatment. In other words, after the groove 8 has been substantially filled with glass (including an overfilling of the groove), the glass is allowed to harden such that no portion of the outer surface 9 of the glass projects beyond an outer edge of the groove, and at least a portion (i.e., the center portion) of the glass outer surface 9 extends inside of the groove outer edge. Thus, it can be considered that a remaining stress on a jointing surface caused by the heat cycles during an operation of the battery does not cause a crack. Conditions of generation of the cracks are tested with respect to various widths A and depths B of the end or bottom surface of the groove 8. The result is illustrated in FIG. 6. Favorable result is obtained by the various combination of the surface width A from 0.2 to 5 mm and the surface depth B from 0.2 to 10 mm. In the combination of the surface width over 5 mm and the surface depth over 10 mm, a large quantity of the solder glass is required, so that thermal expansion can not follow the heat cycle condition (heat raising rate 200° C./H), and thus, the strain causes cracks, resulting in insufficient gastightness and breakage of the jointed part of the alpha alumina ring 1 and the solid electrolyte tube 2.

Figure 4:
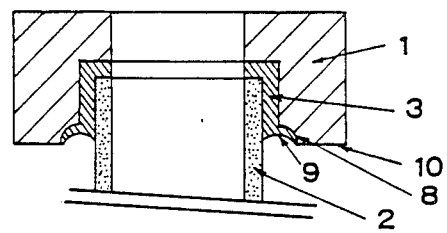
Figure 5:
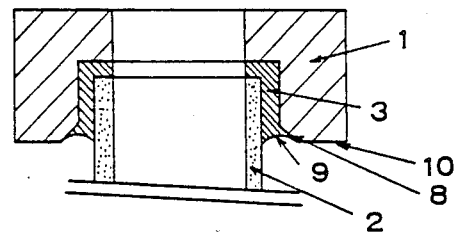

Instead of said rectangular shape, the groove 8 may have a section of a round shape as shown in FIG. 4, a oblique section as shown in FIG. 5 and others, from which similar effect can be achieved.

According to the invention, as described above, since the alpha alumina ring 1 is provided at the open end with the groove for collecting the glass, the cracking of the solder glass, which was generated in the conventional structures, can be prevented, and thus, the gastightness of the battery can be improved, which is actually valuable.

What is claimed is:

1. A sodium-sulfur storage battery comprising:
an alpha alumina ring having a longitudinally extending recess therein,
a sodium conductive solid electrolyte tube having a longitudinal end disposed in said recess, said end being of smaller cross-section than said recess to define an annular space therebetween, and
solder glass disposed in said annular space to join said ring to said tube,
said annular space including a longitudinally inner portion and an enlarged longitudinally outer portion, each said portion containing said solder glass, said enlarged outer portion situated at an open longitudinal end of said recess and defining a groove for collecting the solder glass, said glass being positioned in said groove by substantially filling said groove with molten glass, and allowing said molten glass to harden such that no portion of an outer surface of said glass projects beyond an outer edge of said groove and at least a portion of said glass outer surface extends inside of said groove outer edge, said groove having a width in a radial direction in the range of from 0.2 mm to 5.0 mm and a depth in the longitudinal direction in the range of from 0.2 mm to 10.0 mm.

2. A sodium-sulfur storage battery according to claim 1, wherein said groove has a rectangular cross-sectional shape.

3. A sodium-sulfur storage battery according to claim 1, wherein an inside surface of said groove is of curvalinear cross-sectional shape.

4. A sodium-sulfur storage battery according to claim 1, wherein an inside surface of said groove is of oblique cross-sectional shape.

* * * * *